United States Patent
Matejcek

(10) Patent No.: US 6,599,652 B2
(45) Date of Patent: Jul. 29, 2003

(54) FUEL CELL WITH A DEGASSING DEVICE

(75) Inventor: Lothar Matejcek, Mommenheim (DE)

(73) Assignee: General Motors Corporation, Detroit, MI (US)

( * ) Notice: Subject to any disclaimer, the term of this patent is extended or adjusted under 35 U.S.C. 154(b) by 256 days.

(21) Appl. No.: 09/882,741

(22) Filed: Jan. 11, 2001

(65) Prior Publication Data

US 2001/0036569 A1 Nov. 1, 2001

(30) Foreign Application Priority Data

Feb. 22, 2000 (DE) .......................... 100 08 001
May 18, 2000 (DE) .......................... 100 24 531

(51) Int. Cl.$^7$ ................................................ H01M 8/04
(52) U.S. Cl. .................................. 429/34; 429/26
(58) Field of Search ........................... 429/17, 26, 30, 429/34

(56) References Cited

U.S. PATENT DOCUMENTS

| 5,599,638 A | 2/1997 | Surampudi et al. ........... 429/33 |
| 5,766,786 A | * 6/1998 | Fleck et al. .................... 429/17 |
| 5,981,096 A | * 11/1999 | Hornburg et al. ............. 429/17 |

FOREIGN PATENT DOCUMENTS

| DE | 19807876 | 8/1999 |
| DE | 19807878 | 8/1999 |
| DE | 19745773 | 9/1999 |
| WO | WO99/44250 | 9/1999 |

OTHER PUBLICATIONS

German Search Report—Deutsches Patent–und Markenamt, Jun. 11, 2001, 4 pages.

* cited by examiner

*Primary Examiner*—Stephen Kalafut
(74) *Attorney, Agent, or Firm*—Cary W. Brooks

(57) ABSTRACT

A fuel cell system in which methanol is supplied in liquid form to the fuel cells (so-called Direct Methanol Fuel Cell (DMFC) system) with a container containing a supply of methanol, a conduit line designed to supply liquid methanol leading from the container to the fuel cells, another conduit line running from the fuel cells back to the container, a nozzle present in the other line and a pressure-boosting pump present in the conduit system, characterized by the fact that the pump is arranged in the conduit line leading from the container to the fuel cells, and a cooler is preferably arranged in the conduit line leading from the container to the fuel cells. In this way, one succeeds in supplying the fuel cells with a liquid fuel which is undersaturated with $CO_2$ and therefore can absorb $CO_2$ forming in the fuel cells so that as little gaseous $CO_2$ as possible is contained in the fuel cell system, thus increasing the power of the system.

7 Claims, 1 Drawing Sheet

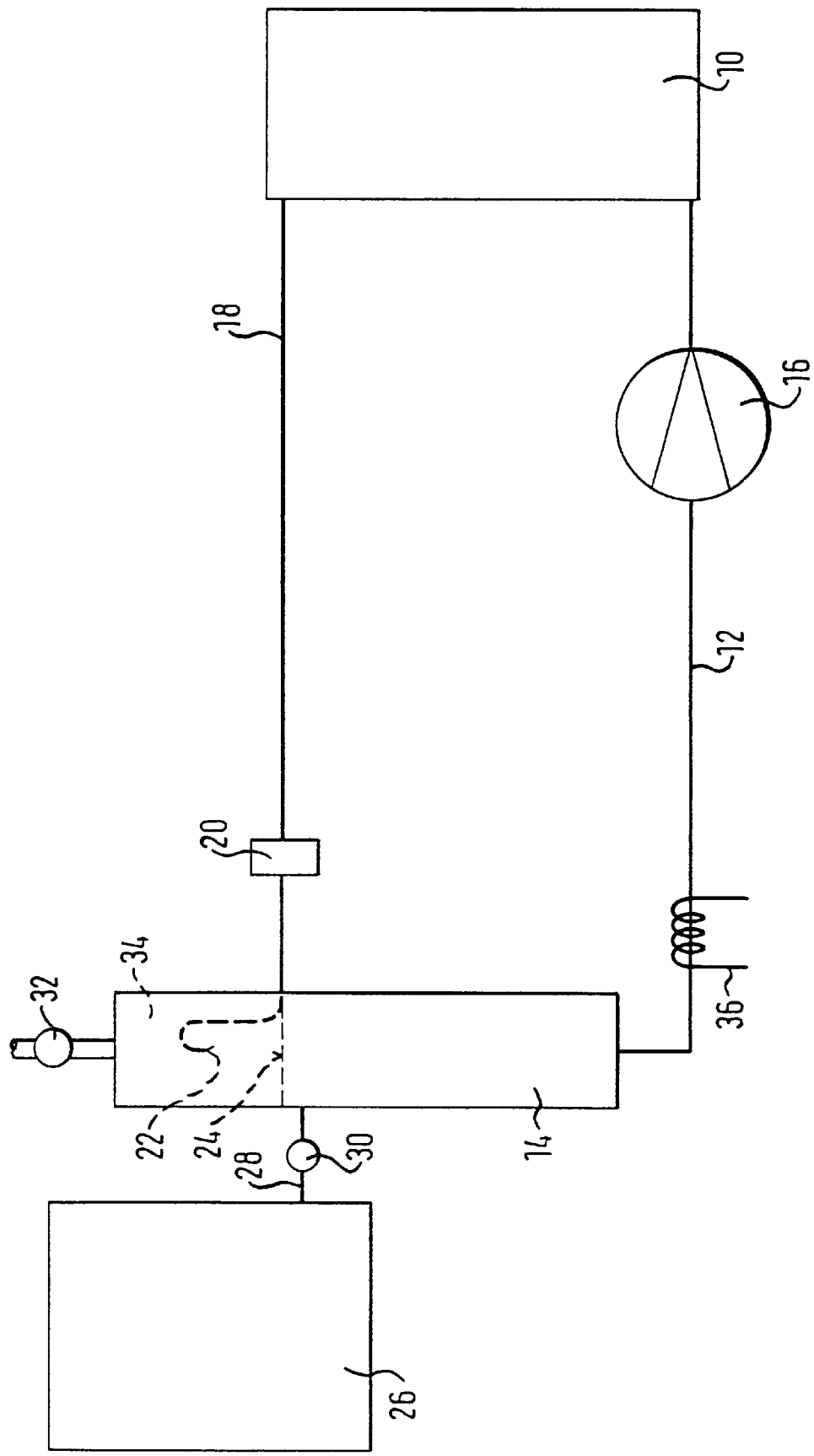

US 6,599,652 B2

FUEL CELL WITH A DEGASSING DEVICE

TECHNICAL FIELD

The present invention pertains to a fuel cell system in which a fuel such as methanol is fed in liquid form to the fuel cells in the so-called DMFC (Direct Methanol Fuel Cell) system with a container holding a supply of fuel, a conduit designed to supply liquid fuel which leads from the container to the fuel cells, another conduit which leads back to the container from the fuel cells, a nozzle provided in the other conduit and a pressure-boosting pump present in the conduit system.

BACKGROUND OF THE INVENTION

A fuel cell system of this type is known from DE 197 45 773 A1.

As described in that document, there are various types of fuel cells, including so-called SOFC fuel cells which work at operating temperatures above 1000° C. and so-called PEM fuel cells which have an operating temperature of about 80° C.

Systems are also known in which a liquid fuel such as methanol can be oxidized on the anode of a PEM fuel cell by means of a catalyst such as platinum, resulting in the release of hydrogen.

SUMMARY OF THE INVENTION

The present invention concerns such fuel cells in which fuel is supplied in liquid form. As the fuel, methanol above all, but also other hydrocarbons, such as hydrazine, come into consideration. Mixtures of hydrocarbons and water can also be used as liquid fuels. The liquid fuel is fed to the fuel cells on the anode side.

When methanol is used as the fuel, the liquid fed to the fuel cells usually consists of 3% $CH_3OH$ and 97% $H_2O$. By reaction with water, part of the $CH_3OH$ is transformed into $CO_2$ so that the mixture leaving the fuel cell consists of $H_2O$, $CH_3OH$ and $CO_2$:

$$CH_3OH + H_2O \longrightarrow 6H^+ + 6e^- + CO_2 \qquad 1$$

The protons thus generated diffuse through the membrane toward the cathode side of the fuel cell, while the electrons pass to the cathode side via the external current circuit. The protons and electrons combine with the oxygen supplied to the cathode side according to the equation:

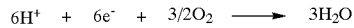

$$6H^+ + 6e^- + 3/2 O_2 \longrightarrow 3H_2O \qquad 2$$

and thus form water. This water is usually fed into the fuel, e.g., fed back since water is required for the reaction of equation 1.

The fuel is frequently supplied supersoichiometrically to the fuel cells so that it is not completely reacted. Liquid fuel therefore emerges from the fuel cells.

In such a DMFC System, the $CO_2$ accumulating as product on the anode side must be sluiced out of the anode cycle. In addition to gas bubbles in the liquid which are relatively easily removed, a certain quantity of $CO_2$ is also dissolved in the liquid. The presence of the reaction product $CO_2$, partly in dissolved form and partly as gas bubbles, in the fuel cell unfavorably influences the power output of the fuel cell. For this reason, it has been attempted, according to the above-cited document DE 197 45 773 A1, to remove the $CO_2$ from the cycle by raising the pressure of the mixture leaving the fuel cells and subsequently depressurizing it for the purpose of causing the gas dissolved in the liquid to pass over into the gas phase upon depressurization, thus making it easily separated from the liquid components.

The arrangement according to De 197 45 773 A1, however, has a disadvantage since the increase in pressure and the subsequent depressurization is arranged in the conduit line leading from fuel cells to the container. Although it is correct that the $CO_2$ appearing at the nozzle upon depressurization escapes, the quantity is limited in principle to that quantity which had passed into solution additionally at the pump arranged in front of the nozzle due to the increase in pressure. The mixture downstream from the nozzle still always contains dissolved $CO_2$ and other gases. An equilibrium is established in the container according to which the mixture departing the container is saturated with $CO_2$ corresponding to the pressure prevailing there and the temperature prevailing there. The saturated mixture is then fed to the fuel cell.

The purpose of the present invention is to improve the system described initially in such a way that the liquid supplied to the fuel cells is undersaturated with $CO_2$.

To solve this problem, the invention provides that the pump be arranged in the conduit line leading from the container to the fuel cells. However, the nozzle should remain at the previously chosen position in the other conduit line.

From the physical aspect, the higher the temperature and the lower the pressure, the less $CO_2$ is dissolved in the liquid. The arrangement according to the present invention has the advantage that the mixture leaving the container is saturated with $CO_2$, is brought to a higher pressure level by the pump and is therefore automatically undersaturated. Therefore the mixture in the fuel cell can absorb gaseous $CO_2$ in a quantity corresponding to the higher pressure. At the nozzle, the mixture is depressurized again and the $CO_2$ dissolved in the liquid passes over into the gas phase. Therefore, part of the dissolved $CO_2$ can be separated out according to the invention and removed from the system so that the liquid reaching the fuel cells is actually undersaturated.

This is advantageous for the operation of the fuel cells, because part of the reaction product $CO_2$ can now be dissolved in the undersaturated liquid and need not be discharged as a gas.

According to a preferred variant of the invention, a cooler is arranged in the conduit line leading from the container to the fuel cells, said cooler preferably being arranged in front of the pump, but it may also be arranged after the pump.

This variant allows for the fact that in the case of lower temperatures more $CO_2$ passes into solution so that by cooling the liquid entering into the fuel cells it can absorb more $CO_2$.

While in the state of the art one always strives to separate $CO_2$ from the system, only with the invention does one succeed in feeding a liquid undersaturated with $CO_2$ to the fuel cells so that the liquid is actually capable of absorbing $CO_2$ into the fuel cells and of clearly reducing the quantity of gaseous $CO_2$.

Especially preferred variants of the invention are presented in the other claims.

BRIEF DESCRIPTION OF THE DRAWINGS

The invention is explained below with reference to the appended drawing which shows a schematic representation of the fuel cell system of the present invention, but where for the sake of simplicity the air/oxygen cycle is not indicated but only the circulation of the liquid fuel, preferably methanol.

DESCRIPTION OF THE PREFERRED EMBODIMENT

In the drawing, the reference number 10 denotes a stack of fuel cell to which methanol is fed through a conduit line 12 from a container 14 by a pressure-boosting pump 16. The drawing also shows another conduit line 18 which leads through a nozzle 20 back to the container 14 and preferably has an opening 22 which is situated in the lower region of the container and points upward. The opening 22 is preferably arranged in a location which is higher than the maximum filling level of the methanol. As a result the liquid, (i.e. the mixture of methanol and water), drops down and separates from the gaseous $CO^2$ which collects in the upper part of the container. Advantageously, the opening 22 of the conduit line faces downward so that the separation is promoted by gravity.

The reference number 26 shows the actual tank of the vehicle which is designed for refilling the container 14, the feed of liquid fuel, methanol in this example, taking place from the tank 26 to the container 14 through the line 28 and a corresponding control valve 30. In the upper region of the container 14, a conventional device 32 for carrying off the gases collecting in the gas space 34 above the liquid level 24 is positioned.

In the conduit line 12, optionally a cooler 36 is provided which is designed as a heat exchanger and has the purpose of cooling the liquid fuel which is fed to the fuel cells 10.

The mode of action of the arrangement according to the invention is the following:

In the operation of the fuel cell liquid fuel, i.e. methanol, is taken with a certain content of water from the container 14 through conduit line 12 and fed to the fuel cells 10 by the pump 16, said pump assuring a pressure increase of, e.g., 2 bar. If present, the cooler 36 serves to cool the liquid, i.e., to about 5 to 20° C.

Even if the liquid in the container 14 is saturated with $CO_2$ at the temperature and pressure conditions prevailing there, one succeeds by raising the pressure produced by the pump 16 and possibly also by cooling provided by the cooler 36, in bringing the liquid to a pressure and temperature level at the entrance to the fuel cells at which it is truly undersaturated with $CO_2$.

$CO_2$ is formed by the generation of current inside the fuel cells 10. Now the latter can be at least partly absorbed in the undersaturated liquid flowing through the fuel cells. Therefore the quantity of gaseous $CO_2$ in the fuel cells 10 can be minimized so that the power of the fuel cells can be increased, and a higher power density relative to structural volume becomes possible. The liquid emerging from the fuel cells 10 passes through conduit 18 still under elevated pressure to the nozzle 20. At the nozzle 20 depressurization takes place at which time part of the $CO_2$ dissolved in the liquid comes out of solution and passes into the gas phase. When the mixture of liquid and gaseous $CO_2$ is fed into the container 14, $CO_2$ ascends from the opening 22 into the gas space 34 and is carried off by the conventional device 32.

As a result of the current generation by the fuel cells 10, methanol is consumed and the liquid in circulation is diluted. In order to assure that sufficient methanol is present in container 14, therefore, fresh methanol is introduced from tank 26 through conduit 28 and the valve 32 to container 14. Conventional measures are employed in order to remove gaseous $CO_2$ from container 14 by means of the device 32 and to recover a portion of the water and methanol from these $CO_2$ exhaust gases.

What is claimed is:

1. A fuel cell system comprising a fuel supplied in liquid form to the fuel cells from a container holding a supply of fuel, a first conduit line designed to supply liquid fuel which leads from the container to the fuel cells, a second line which goes back to the container from the fuel cells, a nozzle provided in the second line and a pressure-boosting pump present in the conduit system, wherein the pump is arranged in the first conduit line leading from the container to the fuel cells.

2. A fuel cell system as in claim 1, further comprising a cooler arranged in the first conduit line leading from the container to the fuel cells.

3. A fuel cell system as in claim 2, wherein the cooler is arranged upstream from the pump.

4. A fuel cell system as in claim 1, wherein the second conduit line opens in the container above the liquid level.

5. A fuel cell system as in claim 4, wherein the second conduit line opens downwardly in the container.

6. A fuel cell system as in claim 4, further comprising a device for carrying off gaseous $CO_2$ from the container.

7. A fuel cell system as in claim 1, further comprising a supply tank containing a liquid fuel connected directly or indirectly to the container and which serves to maintain a preassigned fuel level in the container and for resupplying fresh fuel.

* * * * *